(12) United States Patent
Talbot et al.

(10) Patent No.: US 7,803,278 B2
(45) Date of Patent: Sep. 28, 2010

(54) METHOD FOR CORROSION AND SCALE INHIBITION

(75) Inventors: Robert Eric Talbot, Cannock (GB); Jason Grech, The Berkeleys (GB)

(73) Assignee: Rhodia Operations, Aubervilliers (FR)

( * ) Notice: Subject to any disclaimer, the term of this patent is extended or adjusted under 35 U.S.C. 154(b) by 895 days.

(21) Appl. No.: 10/576,032

(22) PCT Filed: Oct. 14, 2004

(86) PCT No.: PCT/GB2004/004373
§ 371 (c)(1),
(2), (4) Date: Nov. 20, 2006

(87) PCT Pub. No.: WO2005/040050
PCT Pub. Date: May 6, 2005

(65) Prior Publication Data
US 2007/0151930 A1    Jul. 5, 2007

(30) Foreign Application Priority Data
Oct. 16, 2003  (GB)  ................................ 0324238.5

(51) Int. Cl.
C02F 5/12 (2006.01)
C02F 5/14 (2006.01)
(52) U.S. Cl. ............... 210/699; 162/DIG. 4; 166/244.1; 210/700; 252/181; 252/389.23; 422/15
(58) Field of Classification Search .................. 210/699
See application file for complete search history.

(56) References Cited

U.S. PATENT DOCUMENTS

| | | | | | |
|---|---|---|---|---|---|
| 3,049,496 | A | * | 8/1962 | Monroe et al. | 507/263 |
| 3,642,641 | A | * | 2/1972 | Tedeschi et al. | 510/266 |
| 3,658,720 | A | * | 4/1972 | McDougall et al. | 252/392 |
| 3,803,042 | A | * | 4/1974 | Knox et al. | 510/269 |
| 4,039,336 | A | * | 8/1977 | Sullivan et al. | 106/14.13 |
| 4,212,764 | A | * | 7/1980 | Quinlan | 252/392 |
| 4,304,677 | A | * | 12/1981 | Stauffer et al. | 507/272 |
| 4,640,786 | A | * | 2/1987 | Soderquist et al. | 507/237 |
| 5,606,105 | A | * | 2/1997 | Davis et al. | 562/8 |
| 6,192,987 | B1 | * | 2/2001 | Funkhouser et al. | 166/304 |
| 6,926,836 | B2 | * | 8/2005 | Fidoe et al. | 210/700 |

FOREIGN PATENT DOCUMENTS

WO    WO/99/46989    *    9/1999

* cited by examiner

Primary Examiner—Peter A Hruskoci
(74) Attorney, Agent, or Firm—Buchanan Ingersoll & Rooney PC

(57) ABSTRACT

The present invention provides a formulation for use in the treatment of corrosion and metal sulphide scale deposits in aqueous systems, said formulation comprising a tetrakis (hydroxyorgano) phosphonium salt ($THP^+$ salt) and a primary, secondary or tertiary alcohol having an acetylenic bond in the carbon backbone. The invention also provides the use of such a formulation for treating corrosion of mild steel, copper or aluminium, and a method for treatment of an aqueous system containing or in contact with a metal sulphide scale while concomitantly inhibiting the corrosion of surfaces in contact with said aqueous system, which method comprises the addition to said aqueous system of a scale and corrosion inhibiting amount of such a formulation.

16 Claims, No Drawings

METHOD FOR CORROSION AND SCALE INHIBITION

This application is an application under 35 U.S.C Section 371 of International Application Number PCT/GB2004/004373 filed on Oct. 14, 2004.

The present invention relates to a method of preventing or alleviating the problems associated with metal sulphide deposits and to novel formulations for use in such a method.

Tetrakis (hydroxyorgano) phosphonium salts (hereinafter $THP^+$salts), especially tetrakis (hydroxymethyl) phosphonium sulphate (hereinafter THPS) are widely used as metal sulphide dissolver/dispersers within aqueous systems and especially those systems associated with oilfields.

When THPS is used in oilfields, it is typically applied in concentrations of up to 30%, together with an ammonium salt to improve performance. This combination of THPS and an ammonium salt, together with high temperatures that can be experienced in oilfield applications, can be corrosive to mild steel and other metal components.

It is an aim of the present invention to ameliorate the above problems of corrosion by $THP^+$salts when used in aqueous systems.

Accordingly, the present invention, in a first aspect, provides a formulation for use in the treatment of corrosion and metal sulphide scale deposits in aqueous systems, said formulation comprising a $THP^+$salt (as hereinbefore defined), and a primary, secondary or tertiary alcohol having an acetylenic bond in the carbon backbone.

Preferably, the acetylenic bond is adjacent to the hydroxyl group, said alcohol having the general formula (I):

$$R^1C\equiv CCR^2R^3OH \qquad (I)$$

wherein:

$R^1R^2$ and $R^3$ (which may be the same or different) each independently represent hydrogen, $C_1$ to $C_8$ alkyl or functionally substituted alkyl.

In a particularly preferred embodiment of the present invention, the alcohol is propargyl alcohol (2-propyn-1-ol), i.e. in formula (I), $R^1$, $R^2$ and $R^3$ are each hydrogen.

The metal sulphide scale may be iron sulphide. Alternatively, the metal sulphide may be lead sulphide or zinc sulphide or a combination thereof. The iron sulphide may be Troilite (FeS) or Pyrite ($FeS_2$). Alternatively, the iron sulphide may be Mackinawite ($Fe_9S_8$) or Pyrrhotite ($Fe_7S_8$).

The anion of the $THP^+$salt should be compatible with the aqueous system. Preferred anions include sulphate, chloride, phosphate, bromide, fluoride, carbonate, citrate, lactate, tartrate, borate, silicate, formate and acetate. The anion should make the $THP^+$salt water-soluble.

The formulation may further include a surfactant. The surfactant is preferably a cationic surfactant, for example quaternary ammonium compounds, N-alkylated heterocyclic compounds or quaternised amido-amines. Alternatively, anionic, amphoteric or non-ionic surfactants may be used. Aminomethane phosphonates may replace ammonium salts in the aqueous system.

The formulation according to the invention is particularly useful in the prevention of corrosion of mild steel, copper and aluminium.

The present invention also provides, in a second aspect, a method for treatment of an aqueous system containing or in contact with a metal sulphide scale while concomitantly inhibiting the corrosion of surfaces in contact with said aqueous system, which method comprises the addition to said aqueous system of a scale and corrosion inhibiting amount of a formulation in accordance with the first aspect of the invention.

The aqueous system is preferably one used in enhanced oil recovery. Alternatively, the aqueous system may be one used in industrial water systems, paper manufacturing systems and any aqueous system wherein corrosion caused by $THP^+$salts occurs.

The present invention also provides, in a third aspect, a formulation consisting essentially of the reaction product of a $THP^+$salt and an acetylenic alcohol in accordance with the first aspect of the present invention, wherein the ratio of said $THP^+$salt to said acetylenic alcohol is between 1:1 and 750:1.

The formulation as described in the first aspect is preferably used in an effective amount up to 30% by weight as $THP^+$. The amount used will vary by application but it may also be effectively used for low level applications e.g. 1 to 10000 ppm as a $THP^+$salt or in high level applications as 1 to 30% as a $THP^+$ salt. In the second aspect $THP^+$is preferably used in an effective amount of up to 30% by weight as a $THP^+$salt, with the co-addition of an acetylenic alcohol in an effective amount of between 0.1 to 10000 ppm, relative to the volume of the system being treated.

The ratio of $THP^+$to the acetylenic alcohol in the formulation is typically in the range 1:1 to 750:1, more preferentially 15:1 to 300:1, most preferably about 40:1.

The present invention will be illustrated, merely by way of example, as follows.

EXAMPLE 1

Blank Experiment: A 100 ml solution of 20% THPS (26.6 g TOLCIDE®PS75) and 1 g ammonium chloride in synthetic seawater was placed in a 120 ml screw-top jar. A pre-weighed mild steel coupon was immersed in the solution. The jar was then stored in a 50° C. oven for 48 hours. After this time the coupon was cleaned by gentle scrubbing in water, washed with acetone and dried in the oven. The coupons were then reweighed and the corrosion rate calculated according to the equation:

$$\text{Rate} = \frac{K \times W}{A \times T \times d}$$

W=Weight loss in g (to 0.1 mg)
A=Area in $Cm^2$ (to 0.01 $cm^2$)
T=Time of exposure in hours
d=Density in $g/cm^3$ K is a constant defined by the units in which the corrosion rate is required. For example:

| Units | K |
|---|---|
| Mpy—mils per year | $3.45 \times 10^6$ |

This experiment was repeated with various levels of corrosion inhibitor added to the blank solution. The results are shown in Table A below:

TABLE A

| Experiment | Corrosion Rate mpy |
| --- | --- |
| Blank | 208 |
| Blank + 5000 ppm Inhibitor A | 77 |
| Blank + 5000 ppm Inhibitor B | 197 |
| Blank + 5000 ppm Inhibitor C | 116 |
| Blank + 5000 ppm Inhibitor D | 132 |
| Blank + 5000 ppm Inhibitor E | 88 |
| Blank + 5000 ppm Inhibitor F | 86 |
| Blank + 5000 ppm propargyl alcohol | 33 |

Blank—A solution consisting of 20% THPS and 1% ammonium chloride in synthetic seawater.

Inhibitor A—Commercially available corrosion inhibitor comprising ethoxylated ammonium chloride, dibutyl thiourea and ethoxylated fatty acid.

Inhibitor B—Commercially available corrosion inhibitor comprising polyoxyethylene 2-ethylhexyl ether phosphate.

Inhibitor C—Oilfield corrosion inhibitor comprising fatty acids and Tall oil reaction products with diethylene triamine.

Inhibitor D—Commercially available corrosion inhibitor comprising a phosphonocarboxylic acid.

Inhibitor E—Standard commercially available oilfield corrosion inhibitor based on an amine alkoxylate.

Inhibitor F—Standard commercially available oilfield corrosion inhibitor comprising an amine ethoxylate and a quaternary ammonium chloride.

The invention claimed is;

1. A method for the treatment of an aqueous system containing or in contact with a metal sulfide scale while concomitantly inhibiting the corrosion of surfaces in contact with said aqueous system, said method comprising:

adding to said aqueous system a scale and corrosion inhibiting amount of an anti-corrosion and anti-metal sulfide scale formulation consisting essentially of a tetrakis (hydroxyorgano) phosphonium salt, a primary, secondary or tertiary alcohol having an acetylenic bond in the carbon backbone, an ammonium salt, and optionally a surfactant, wherein a ratio of the tetrakis (hydroxyorgano) phosphonium salt to the acetylenic alcohol is between 1:1 and 750:1.

2. The method according to claim 1 wherein the aqueous system is used in enhanced oil recovery.

3. The method as claimed in claim 1 wherein the aqueous system is used in industrial water systems or paper manufacturing systems.

4. The method as claimed in claim 1 wherein the tetrakis (hydroxyorgano) phosphonium salt is added to the aqueous system in an effective amount of up to 30% by weight.

5. The method according to claim 1, wherein the acetylenic bond is adjacent to the hydroxyl group, said alcohol having the general formula (I):

$$R^1C \equiv CCR^2R^3OH \quad (I)$$

wherein:
$R^1$, $R^2$ and $R^3$ being the same or different, each independently represent hydrogen,
$C_1$ to $C_8$ alkyl or functionally-substituted alkyl.

6. The method according to claim 5, wherein $R^1$, $R^2$ and $R^3$ each independently represent hydrogen or $C_1$ to $C_8$ alkyl.

7. The method according to claim 6, wherein the alcohol is propargyl alcohol.

8. The method according to claim 1 wherein the metal sulfide scale is iron sulfide, lead sulfide or zinc sulfide.

9. The method according to claim 1, wherein the tetrakis (hydroxyorgano) phosphonium salt comprises an anion selected from the group consisting of sulphate, chloride, phosphate, bromide, fluoride, carbonate, citrate, lactate, tartrate, borate, silicate, formate and acetate.

10. The method according to claim 1, wherein the formulation includes a surfactant.

11. The method according to claim 10, wherein the surfactant is a cationic surfactant.

12. The method according to claim 11, wherein the cationic surfactant is selected from the group consisting of quaternary ammonium compounds, N-alkylated heterocyclic compounds, quaternised amido-amines, and amino methane phosphonates.

13. The method according to claim 10 wherein the surfactant is selected from the group consisting of anionic, amphoteric and non-ionic surfactants.

14. The method according to claim 1 wherein the surfaces in contact with the aqueous system comprise mild steel, copper or aluminum.

15. The method according to claim 1, wherein the ratio is between 15:1 and 300:1.

16. The method according to claim 15, wherein the ratio is about 40:1.

* * * * *